United States Patent [19]
Lee et al.

[11] Patent Number: 5,281,792
[45] Date of Patent: Jan. 25, 1994

[54] BATTERY WARMER

[75] Inventors: Richard J. Lee, Murrysville; James L. Beene, Export, both of Pa.; David P. Jeffrey, Towner, N. Dak.; Thomas L. Jones, Irwin, Pa.

[73] Assignee: RJ Lee Group, Inc., Monroeville, Pa.

[21] Appl. No.: 753,631

[22] Filed: Aug. 30, 1991

[51] Int. Cl.⁵ .................... H05B 1/02; H02J 7/02
[52] U.S. Cl. .................................... 219/209; 320/2
[58] Field of Search ............. 219/209, 205, 202, 492, 219/506, 526, 543, 544, 549, 528; 320/2, 24; 429/62, 120

[56] References Cited

U.S. PATENT DOCUMENTS

| | | | |
|---|---|---|---|
| 2,710,936 | 6/1955 | Lowry et al. | 320/2 |
| 3,110,633 | 11/1963 | Bachmann | 219/209 |
| 3,156,183 | 11/1964 | Trainor | 219/526 |
| 3,418,450 | 12/1968 | Schott | 219/279 |
| 3,440,515 | 4/1969 | Swartz | 320/24 |
| 3,469,072 | 9/1969 | Carlson | 219/202 |
| 3,496,855 | 2/1970 | DeBoer | 98/2 |
| 3,527,925 | 9/1970 | Tooyooka et al. | 219/544 |
| 3,599,071 | 8/1971 | Lapuyade et al. | 320/35 |
| 3,649,366 | 3/1972 | Jordan et al. | 429/120 |
| 3,673,379 | 6/1972 | Eversull | 219/202 |
| 3,767,995 | 10/1973 | Kaminski et al. | 320/22 |
| 3,798,072 | 3/1974 | Anderson | 219/205 |
| 3,870,855 | 3/1975 | Edlund et al. | 219/202 |
| 3,890,555 | 6/1975 | Nelson et al. | 320/2 |
| 4,025,861 | 5/1977 | Godard et al. | 320/23 |
| 4,081,737 | 3/1978 | Miyahara | 320/2 |
| 4,095,938 | 6/1978 | Mikaila | 432/225 |
| 4,171,508 | 10/1979 | Sinclair | 320/2 |
| 4,209,736 | 6/1980 | Reidenbach | 320/22 |
| 4,229,687 | 10/1980 | Newman | 429/120 |
| 4,300,087 | 11/1981 | Meisner | 320/2 |
| 4,308,492 | 12/1981 | Mori et al. | 320/32 |
| 4,308,493 | 12/1981 | Kothe et al. | 320/35 |
| 4,390,828 | 6/1983 | Converse et al. | 320/32 |
| 4,404,462 | 9/1983 | Murray | 219/506 |
| 4,563,629 | 1/1986 | Keiper | 320/2 |
| 4,591,692 | 5/1986 | Wightman | 219/209 |
| 4,644,247 | 2/1987 | Burmenko | 320/39 |
| 4,644,249 | 2/1987 | Chang | 323/223 |
| 4,738,906 | 4/1988 | Sanders | 429/120 |
| 4,762,978 | 8/1988 | Tanis | 219/209 |
| 4,780,618 | 10/1988 | Wareman et al. | 307/9 |
| 4,831,321 | 5/1989 | Cooper | 320/2 |
| 4,843,299 | 6/1989 | Hutchings | 320/31 |
| 4,853,607 | 8/1989 | Walter et al. | 320/36 |
| 4,857,820 | 8/1989 | Tompkins et al. | 320/2 |
| 4,889,973 | 12/1989 | Farinacci et al. | 219/528 |
| 4,926,106 | 5/1990 | Tanis | 320/35 |
| 5,039,927 | 8/1991 | Centafanti | 320/2 |
| 5,055,656 | 10/1991 | Farah et al. | 219/209 |

FOREIGN PATENT DOCUMENTS

| | | | |
|---|---|---|---|
| 2-123929 | 5/1990 | Japan | 320/2 |
| 693191 | 6/1953 | United Kingdom | 429/120 |

Primary Examiner—Geoffrey S. Evans
Attorney, Agent, or Firm—Webb, Burden, Ziesenheim & Webb

[57] ABSTRACT

A battery warmer for a vehicle mounted storage battery comprises a resistance heater for warming the battery and a combination power supply within a single electrically insulated enclosure passing a dc current to the battery terminals and controlling the ac power to limit the temperature of the resistance heater.

26 Claims, 2 Drawing Sheets

BATTERY WARMER

BACKGROUND OF THE INVENTION

The fact that vehicle storage batteries are more effective for starting a vehicle engine when kept warm is well known. Numerous schemes for heating batteries have been proposed. The applicants have discovered that by inducing fluid motion currents in the electrolyte with a trickle charge, the battery can be easily and efficiently warmed in conditions of extreme cold.

Systems for simultaneously heating and charging a vehicle battery have been proposed. See, for example, Bachmann U.S. Pat. No. 3,110,633 which discloses heating and charging a vehicle battery with energy supplied by the generator or alternator when the vehicle engine is running. Carlson U.S. Pat. No. 3,469,072 teaches heating and charging simultaneously when the engine is running but only heating when the engine is not running. Edlund et al. U.S. Pat. No. 3,870,855 teaches a timer-controlled circuit for heating the engine, the cab and charging the battery. No control of the charging current or the heater temperature is provided. Miyahara U.S. Pat. No. 4,081,737 teaches simultaneously charging and heating a battery but with no individual control of the heating and charging circuits.

SUMMARY OF THE INVENTION

It is an object, according to this invention, to provide a system for simultaneously heating and charging a vehicle storage battery when the vehicle is not running.

It is a further advantage, according to this invention, to improve the heating rate of a vehicle storage battery by fluid motion in the electrolyte by the application of a charging current to the battery.

It is a still further advantage, according to this invention, to provide an improved vehicle mounted battery warming and trickle charging system for keeping the temperature of batteries warm when the vehicle is not running.

It is an advantage, according to this invention, to substantially improve the starting response of cars, trucks, buses, as well as other battery-started vehicles such as farm equipment, construction equipment and stationary engines in cold or very cold weather.

It is a still further advantage, according to this invention, to provide one or more electrical power outlets to enable electrical connection for heating other engine components such as a block heater, dipstick heater and the like.

Briefly, according to this invention, there is provided a combined warmer and trickle charger for a vehicle mounted storage battery comprising a resistance heater for warming the battery, a combination power supply within a single electrically insulated enclosure, and a cable and plug for connecting the power supply to a standard electrical outlet to provide ac power. The power supply comprises a first circuit comprising a step-down transformer and means for rectifying the ac power to supply a direct current. A controller is provided for limiting the direct current flowing therein. Two terminals are provided for connecting the dc output of the first circuit to the terminals of the battery. The power supply comprises a second circuit comprising a substantially nondissapative circuit for controlling the ac power to limit the temperature of the resistance heater and two output terminals for connecting the second circuit to the resistance heater. Preferably, the electrically insulated enclosure is injection or dip-molded plastic.

The first circuit may comprise a split bobbin transformer to better isolate the ac current from the vehicle, a full-wave rectifier, a capacitor to smooth the output of the rectifier, and a direct current regulator to limit the battery charging current. Preferably, the first circuit has a light emitting diode (LED) therein mounted to the insulated enclosure for signaling that trickle charging current is available and to indicate that the battery has been connected with the correct polarity. The LED is preferably connected in parallel with the output terminals. The second circuit may comprise a triac switch or silicon controlled rectifier (SCR), a temperature sensing element and control logic for adjusting the triggering instances of the triac switch or SCR to control the voltage across the heating element. Because the triac is an on/off device, it is substantially nondissapative. Preferably, the heat sensitive element is a thermistor.

According to a preferred embodiment, one or more standard ac electrical outlets are provided on the insulated casing and a third circuit connects ac power to the standard electrical outlet.

Preferably, the resistance heater comprises at least one heat-dispersing metal plate with a temperature sensor and resistive heating element mounted thereon. Most preferably, the plate is aluminum, the temperature sensor is a thermistor, and the resistive heating element is an etched foil resistive heating element. The heat-dispersing plate of the resistance heater may have an adhesive, preferably an adhesive having good heat conductive properties on one side thereof for securing the plate to the battery.

According to another preferred embodiment, the resistive heater comprises an etched foil resistive heating element without a heat dispensing metal plate, but with the temperature sensor mounted directly to the heater substrate electrically isolated from the heater element. The heater element substrate is either a rigid or flexible insulating membrane which may be adhesively mounted directly to the battery wall.

According to a preferred embodiment, the heater comprises a flat aluminum plate with an adhesive material on one side, the resistive heater being attached to the other side and extending outwardly toward the edges of the plate to evenly distribute heat to the plate, and a thermistor mounted on said plate at a location not in direct contact with the heater.

In yet another preferred embodiment, the resistance heater comprises a conductive rubber strap with a temperature sensor and resistive heating element embedded therein. Preferably, the resistance heater comprises fine wires embedded in the rubber strap and the temperature sensor comprises a thermistor embedded in the strap, the strap having one side an adhesive material for mounting the strap heater directly to the battery wall.

In yet another preferred embodiment, the resistance heater comprises a resistive heating element embedded in the casing of the battery with a temperature sensor embedded in the casing adjacent to the resistive heating element. Preferably, the resistive heating element is an etched foil resistance element and the temperature sensor is a thermistor.

BRIEF DESCRIPTION OF THE DRAWINGS

Further features and other objects and advantages will become clear from the following detailed description made with reference to the drawings in which.

DESCRIPTION OF THE PREFERRED EMBODIMENTS

Figure 1:
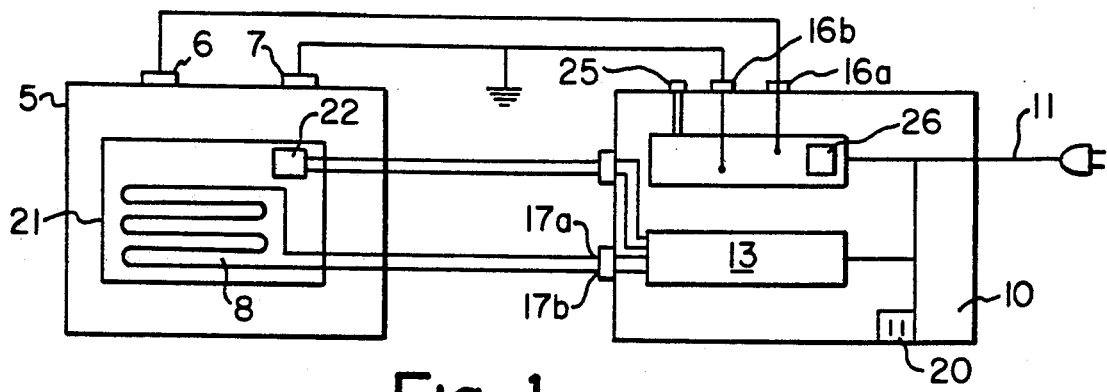
FIG. 1 is an overall schematic illustrating the generic system according to this invention.

Referring now to FIG. 1, a vehicle storage battery 5 has positive and negative terminals 6 and 7. The battery would be connected to the vehicle's electrical system in the usual manner. Connected to the terminals 6 and 7, in parallel with the vehicle's electrical system, is the battery charging system. On the side of the battery there is mounted an electrical resistance heater 8. The battery charging system and heater cooperate together to maintain the battery ready when the vehicle is parked and the engine shut down in extremely cold weather.

A combination power supply 10 is powered by commercial alternating current (115 VAC, 60 Hz, for example) through a standard electrical cord and plug 11. The power supply 10 supplies current limited and voltage limited charging current to the battery 5 and temperature limited alternating current to the heater 8. The power supply is also provided with one or more standard receptacles 20 allowing conventional engine block warmers to be plugged in at the combination power supply.

Figure 6:
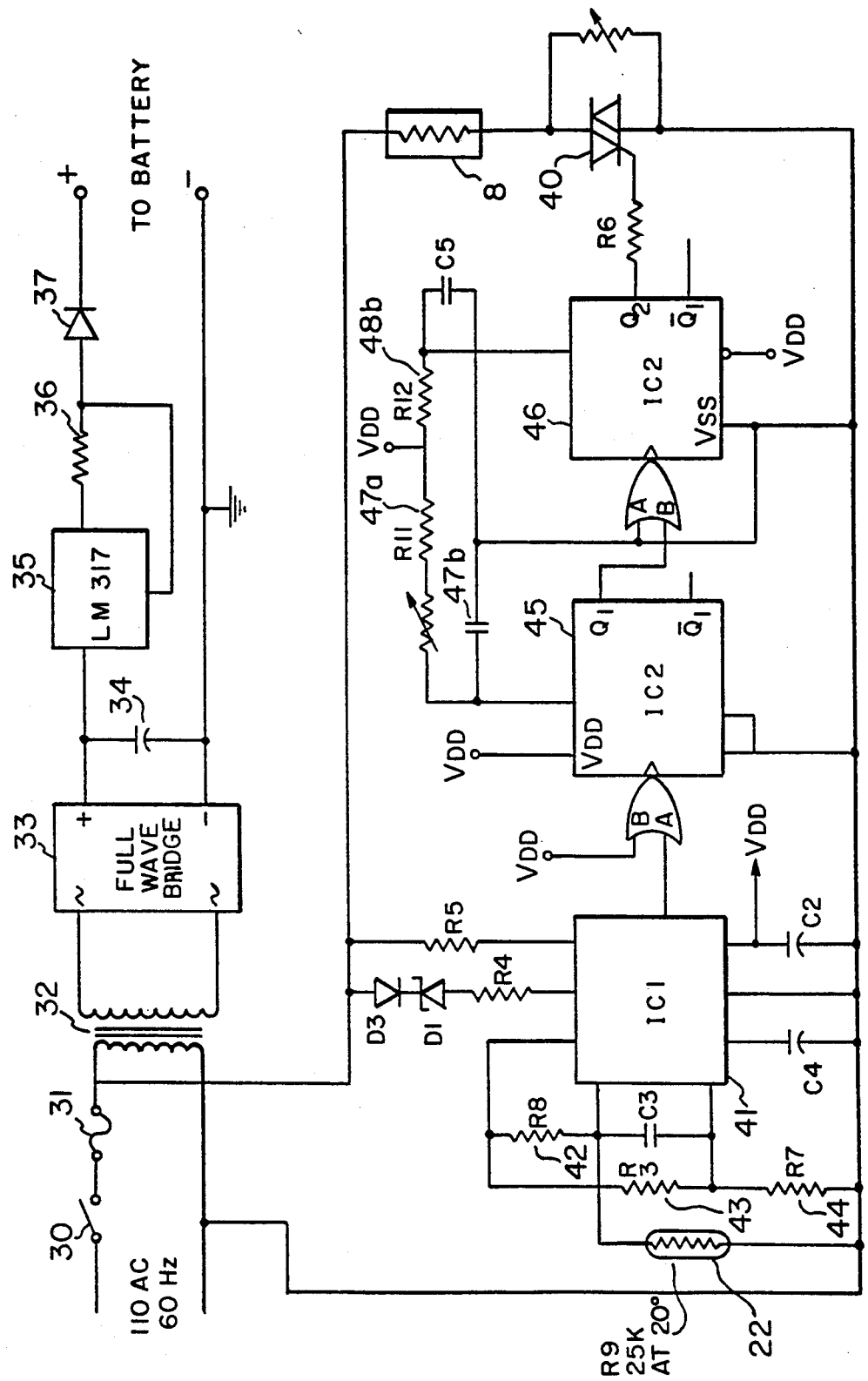
FIG. 6 is a schematic of one embodiment of an electrical circuit including power supply suitable in the practice of this invention.

Referring to FIG. 6, the power supply 10 is provided with a fuse 31 and optionally with an on/off switch 30 at the input of the ac voltage. The 115 volts ac is applied to a split bobbin step-down transformer 32. The low voltage winding of the step-down transformer is applied across a full-wave bridge rectifier 33. As shown in the drawing the bridge rectifier is available as a packaged unit with two ac input terminals and two dc output terminals. Full-wave bridges are comprised of four diodes. The output of the rectifier is filtered by a 470 microfarad storage capacitor 34. If the ac power remains substantially 115 volts, then the maximum voltage on the capacitor is between 19 and 20 volts. The negative side of the storage capacitor is grounded. The positive side is connected to a voltage regulator 35, a sense resistor 36 in series therewith and a diode 37. The current regulator may, for example, be an IC designated LM317. The diode prevents discharge of the battery through the charging circuit. The battery charges at a rate of up to 400 milliamps if the battery is warm and at a rate between 100 and 200 milliamps if the battery is cold (less than 0° C.).

The system according to this invention is not designed to charge dead batteries, although it does supply a slight charging current. The charging current is designed to stir the fluids in the battery to improve the warming by the heater.

The power supply also has a heater control circuit. The battery heater powered by ac current is controlled by a triac (or SCR) 40. The turn-on time of the triac (or SCR) switch on each half cycle of the ac voltage applied across the heater 8 and triac (or SCR) 40 is controlled by duel precision monostable multivibrators (one-shots) 45 and 46 which delay the turn-on time of the triac (or SCR) 40 so that only a portion of the half-wave 115 volt ac cycle is applied to the triac (or SCR). This portion of the 115 volt ac cycle thus generates a low power density which is applied to the heater element. This low density power is determined by the trigger time settings of the one-shots 45 and 46. The resistive element 47a and the capacitive element 47b comprise a time function input of the one-shot 45 which has an output pulse that triggers the second one-shot 46 at the end of the delay time. The output of the second one-shot 46 is the pulse that triggers the triac (or SCR) 40. The resistive element 48a and the capacitive element 48b comprise a time function input of the one-shot 46. These elements are chosen so that the output pulse from one-shot 46 terminates well before the next cycle. The one-shot 45 is triggered by the output of the time proportional trigger circuit 41 which is designated TDA 1023. Thermistor 22 is connected in one leg of a bridge circuit comprising the thermistor 22, fixed resistor 42 and adjustable resistors 43 and 44, which may be either fixed or variable so as to calibrate the bridge network. Resistors 43 and 44 may simply comprise a single potentiometer. The adjustment of the potentiometer or the value selected by fixed resistors 43 and 4 establishes the set point temperature of the heater. The set point should prevent heating above about 20° C.

Figures 2, 3:
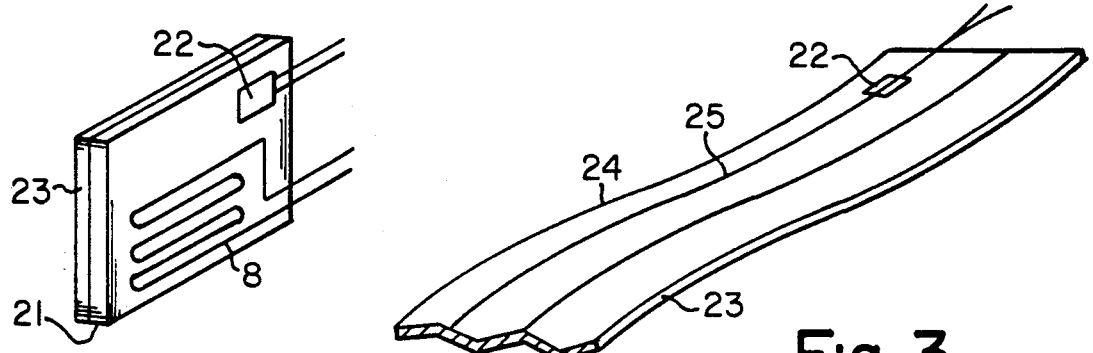
FIG. 2 is a detailed perspective drawing illustrating a plate heater according to this invention.
FIG. 3 is a perspective drawing illustrating a strap heater according to this invention.

Referring to FIG. 2, the heater may comprise an aluminum plate 21 that may vary less than 1 mm up to several mm, say 3-10 mm, thick to provide proper heat distribution and transfer with an attached adhesive 23 on one face, preferably an adhesive having relatively high thermal conductivity. As prepared, the adhesive is covered with a protective layer to which the adhesive does not bond. Most preferably, the battery is heated with two heater plates electrically connected in series. On the other face of the aluminum plate, an etched foil heating element 8 covered by a protective insulating layer and the thermistor 22 are attached.

Figure 5:
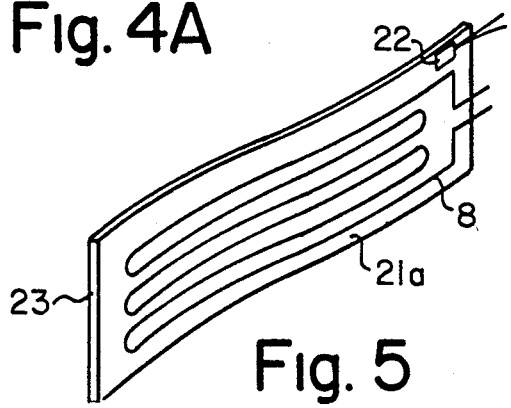
FIG. 5 is a detailed perspective drawing illustrating a flexible heater according to this invention.

Alternately (see FIG. 5), the heater may comprise an etched circuit heating element supported by a flexible substrate 21a covered by a protective insulating layer with an attached adhesive 23 on one face, preferably, an adhesive having a high thermal conductivity. As prepared, the adhesive is covered with a protective layer to which the adhesive does not bond.

Installation of the heater plates or etched circuit heaters is best a two-step process. First, the plates or etched circuit heaters should be positioned along each side of the battery to be sure the wires connecting them are sufficiently long and to mark the position on the battery where the plates are to be positioned. Then, the protective layer is removed from the adhesive and the plates are pressed into the premarked positions on the sides of the battery.

Referring to FIG. 3, the heater may comprise a long rubber strap 24 with embedded heating elements 25 and thermistor 22 and with an adhesive on one side 23. The adhesive is covered with a protective layer to which the adhesive does not bond. Installation of the heater strip is best a two-step process. The first step comprises wrapping the strap around the battery prior to removing the adhesive strap to determine the correct manner of angling the strap so that is never overlaps itself and then to mark the positioning of the strap around the battery. The second step is to remove the protective layer from the strap and to wrap the strap around the battery following the marks of step one.

Figures 4A, 4B:
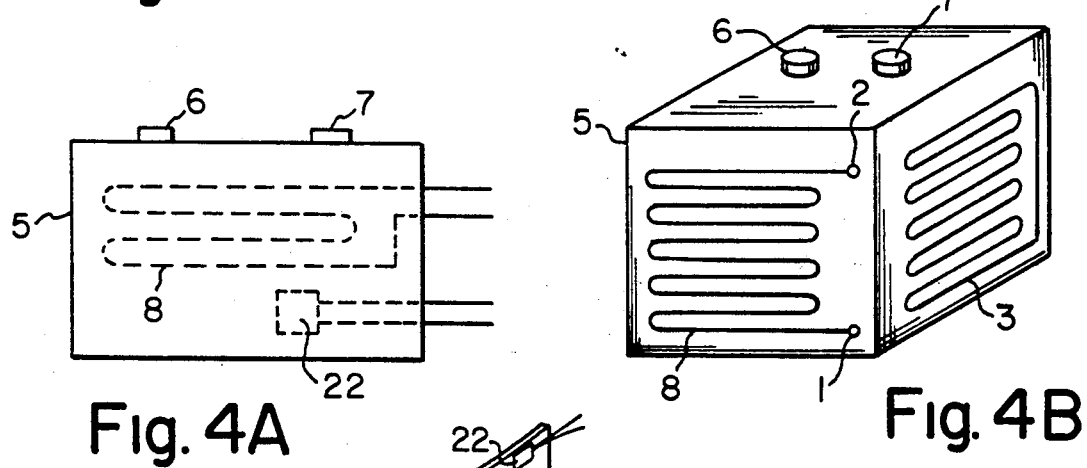
FIGS. 4A and 4B are perspective drawings illustrating a heater embedded in the casing of a battery according to this invention.

Referring to FIGS. 4A and 4B, the heater 8 and thermistor 22 may be embedded in the wall or walls of the battery case. Referring to FIG. 4B, the heater 8 may be embedded in the wall or walls of the battery case with either direct connection via terminals and 2 or by electrical induction of the commercial alternating current to heater element 3 or by an alternating current of different frequency through electrical induction to element 3.

It is desirable to apply a blanket (heat insulating) material around four sides and below the battery. This insulation will aid in keeping the battery warm.

Having thus defined our invention in the detail and particularity required by the Patent Laws, what is desired to be protected by Letters Patent is set forth in the following claims.

We claim:

1. A battery warmer for a vehicle mounted storage battery having positive and negative terminals comprising:
   a) a resistance heater for warming the battery,
   b) a combination power supply within a single electrically insulated enclosure,
   c) a cable and plug for connecting the combination power supply to a standard electrical outlet to provide ac power, wherein said combination power supply comprises:
      a first circuit comprising a step-down transformer, means for rectifying the ac power and limiting the current flowing therein and two terminals for connecting the output of the first circuit to the battery terminals, and
      a second circuit comprising a substantially nondissapative means for controlling the ac power to limit the temperature of the resistance heater and two terminals for connecting the second circuit to the resistance heater.

2. The battery heater according to claim 1 wherein a standard ac electrical outlet is provided on the insulated casing and a third circuit connects ac power to the standard electrical outlet.

3. The battery heater according to claim 1 wherein two or more standard electrical outlets are provided on the casing and a third circuit connects ac power to the standard electrical outlets.

4. The battery heater according to claim 1 wherein the resistance heater comprises at least one heat-dispersing plate with a temperature sensor and resistive heating element mounted thereon.

5. The battery heater according to claim 4 wherein the temperature sensor is a thermistor and the resistive heating element is an etched foil resistive heating element.

6. The battery heater according to claim 5 wherein the heat-dispersing plate of the resistance heater has a heat conducting adhesive on one side thereof for securing the plate to the battery.

7. The battery heater according to claims 4, 5 or 6 wherein the heater comprises a flat aluminum plate with an adhesive material on one side, the resistive heater being attached to the other side and extending outwardly to the edges of the plate to evenly distribute heat to the plate, and a thermistor mounted on said plate at a location not in direct contact with the heater.

8. The battery heater according to claims 4, 5 or 6 wherein the heater comprises either a rigid or flexible material with an adhesive on one side, the resistive heater being attached to the other side and extending outwardly toward the edges of the plate to evenly distribute heat to the plate, and a thermistor mounted on said plate at a location not in direct contact with the heater.

9. The battery heater according to claim 1 wherein the resistance heater comprises a conductive rubber strap with a temperature sensor and resistive heating element embedded therein.

10. The battery heater according to claim 9 wherein the resistance heater comprises fine wires embedded in the rubber strap and the temperature sensor comprises a thermistor embedded in the strap.

11. The battery heater according to claim 1 wherein the resistance heater comprises a resistive heating element embedded in the casing of the battery with a temperature sensor embedded in the casing adjacent to the resistive heating element.

12. The battery heater according to claim 11 wherein the resistive heating element is an etched foil element and the temperature sensor is a thermistor.

13. The battery heater according to claim 1 wherein the first circuit has a light emitting diode therein mounted to the insulated enclosure for signaling the circuit connection to the battery is of the correct polarity and that trickle charging current is available.

14. The battery heater according to claim 1 wherein the insulated enclosure is a plastic molded enclosure made by either injection molding or dip molding.

15. The battery heater according to claim 1 wherein the first circuit comprises a step-down transformer for providing ac voltage to a full-wave rectifier, the rectifier being connected directly at one output to an output terminal and at the other output through a current limiting circuit and then through a diode to the other output terminal.

16. The battery heater according to claim 1 wherein the first circuit and/or the second circuit is embedded in the battery casing and integral with the casing.

17. The battery heater according to claim 16 wherein the ac power is transferred via a transformer with the secondary windings of said transformer being embedded in the battery case and with the primary of the transformer being external to the battery but attaching to the battery immediately adjacent to the location of the secondary winding embedded in the battery.

18. The battery heater according to claim 17 wherein the secondary windings of the transformer which is embedded in the battery casing, is itself the heating element and with the primary of the transformer being external to the battery but attaching to the battery immediately adjacent to the location of the secondary heating element winding embedded in the battery.

19. The battery heater according to claim 15 wherein the transformer is a split bobbin transformer.

20. The battery heater according to claim 1 wherein the second circuit comprises back-to-back controlled rectifiers and means for controlling proportion of each ac cycle during which the controlled rectifiers conduct in response to the temperature of the heating element.

21. The battery heater according to claim 20 wherein the second circuit comprises a standard silicon controlled rectifier and the means for controlling proportion of each ac cycle during which the controlled rectifier conducts in response to the temperature of the heating element.

22. The battery heater according to claim 1 wherein the bottom and sides of the battery are thermally insulated.

23. The battery heater according to claim 1 wherein the first circuit comprises a split bobbin transformer to better isolate the ac current from the vehicle, a full-wave rectifier, a capacitor to smooth the output of the rectifier, and a direct current regulator to limit the battery charging current regardless of the battery temperature.

24. The battery heater according to claim 1 wherein the second circuit comprises a triac or SCR switch, a temperature sensing element and control logic for adjusting the triggering instances of the triac switch to control the voltage across the heating element.

25. The battery heater according to claim 24 wherein the heat sensitive element is a thermistor.

26. The battery heater according to claim 1, wherein there are additional second circuits, each comprising a substantially nondissapative circuit for controlling the ac power to limit the temperature of a resistance heater and each being connected to one of multiple resistance heaters and each having two terminals for connecting the second circuits to the resistive heater element.

* * * * *